(12) United States Patent
Lee et al.

(10) Patent No.: US 8,611,001 B2
(45) Date of Patent: Dec. 17, 2013

(54) ELECTRONIC PAPER DISPLAY DEVICE AND METHOD OF MANUFACTURING THE SAME

(75) Inventors: Hwan Soo Lee, Seoul (KR); Yong Soo Oh, Gyoenggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 118 days.

(21) Appl. No.: 13/373,295

(22) Filed: Nov. 10, 2011

(65) Prior Publication Data

US 2012/0147455 A1 Jun. 14, 2012

(30) Foreign Application Priority Data

Dec. 13, 2010 (KR) ........................ 10-2010-0126656

(51) Int. Cl.
*G02B 26/00* (2006.01)
*G09G 3/34* (2006.01)

(52) U.S. Cl.
USPC .......................................... 359/296; 345/107

(58) Field of Classification Search
CPC .......... G02B 26/007; G02F 1/172; G02F 1/23
USPC .................................. 345/107, 108; 359/206
See application file for complete search history.

(56) References Cited

U.S. PATENT DOCUMENTS

| 7,394,509 B2 | 7/2008 | Sage |
| 2004/0169912 A1 | 9/2004 | Liang et al. |

FOREIGN PATENT DOCUMENTS

| JP | 2001-509275 | 7/2001 |
| KR | 10-2007-0068882 | 7/2007 |
| KR | 10-2010-0125607 | 12/2010 |

OTHER PUBLICATIONS

English Translation—KIPO Notification of Reasons for Refusal for Korean Patent Application No. 10-2010-0126656 (mailed Jan. 18, 2012).*
English Translation—KIPO Written Opinion (Written Reply, Written Substantiation) for Korean Patent Application No. 10-2010-0126656 (mail Sep. 5, 2012).*
Korean Office Action mailed Jan. 18, 2012 issued in corresponding Korean Patent Application No. 10-2010-0126656.

* cited by examiner

*Primary Examiner* — David N Spector

(57) ABSTRACT

The present invention provides an electronic paper display device including: a lower structure having first rotating balls; an upper structure disposed on the lower structure and having second rotating balls with a larger size than the first rotating balls; and an insulating oil for filling a space between the lower structure and the upper structure, wherein the first rotating balls are disposed to face a region between the second rotating balls.

16 Claims, 5 Drawing Sheets

100

110

116a 116b  114a 114  112
 \___/
  116

120

130  126a 126b  124a 124 122 142
      \___/
       126

ELECTRONIC PAPER DISPLAY DEVICE AND METHOD OF MANUFACTURING THE SAME

CROSS-REFERENCE TO RELATED APPLICATIONS

This application claims the benefit under 35 U.S.C. Section 119 of Korean Patent Application Serial No. 10-2010-0126656, filed Dec. 13, 2010, which is hereby incorporated by reference in its entirety into this application.

BACKGROUND OF THE INVENTION

1. Field of the Invention

The present invention relates to an electronic paper display device and a method of manufacturing the same, and more particularly, to an electronic paper display device with improved color gamut, definition, and reflectivity, and a method of manufacturing the same.

2. Description of the Related Art

Among next generation display devices, an electronic paper display device is characterized in that it has higher availability and flexibility than other display devices and is driven with low power. Accordingly, the electronic paper display device can replace paper print media such as books and be applied to various kinds of fields such as screens and electronic wallpaper.

At present, a representative electronic paper display device is a twist ball type electronic paper display device which uses a rotating ball consisting of hemispheres of different colors. The twist ball type electronic paper display device includes a plurality of rotating balls, a barrier structure for separating the rotating balls, an electrode structure for rotating the rotating balls, and a transparent insulating oil for providing lubricity to the rotating balls. In the electronic paper display device having this structure, since each of the rotating balls has a spherical shape, a dead region of color representation, in which colors are not represented, is formed in a space between the rotating balls. This dead region gives constraints on improving color gamut, definition, and reflectivity of the electronic paper display device.

SUMMARY OF THE INVENTION

The present invention has been invented in order to overcome the above-described problems and it is, therefore, an object of the present invention to provide an electronic paper display device having a structure capable of improving color gamut, definition, and reflectivity by reducing a dead region, in which colors are not represented, between rotating balls.

It is another object of the present invention to provide a method of manufacturing an electronic paper display device having a structure capable of improving color gamut, definition, and reflectivity by reducing a dead region, in which colors are not represented, between rotating balls.

In accordance with one aspect of the present invention to achieve the object, there is provided an electronic paper display device including: rotating balls disposed on the same plane to represent colors to the outside; and an auxiliary color representation means for representing colors to the outside through a space between the rotating balls.

In accordance with an embodiment of the present invention, the auxiliary color representation means may include rotating balls with a smaller size than the rotating balls.

In accordance with an embodiment of the present invention, the auxiliary color representation means may include rotating balls disposed to face a region between the rotating balls.

In accordance with an embodiment of the present invention, the electronic paper display device may include a barrier structure for separating the rotating balls in a lateral direction, wherein the barrier structure may be made of a transparent material having light transmittance, and the auxiliary color representation means may represent colors to the outside through the barrier structure.

In accordance with another aspect of the present invention to achieve the object, there is provided an electronic paper display device including: a lower structure having first rotating balls; an upper structure disposed on the lower structure and having second rotating balls with a larger size than the first rotating balls; and an insulating oil for filling a space between the lower structure and the upper structure, wherein the first rotating balls are disposed to face a region between the second rotating balls.

In accordance with an embodiment of the present invention, the lower structure may include a first plate and a first barrier structure formed on the first plate and having first cavities in which the first rotating balls are positioned, and the upper structure may include a second plate and a second barrier structure formed on the second plate and having second cavities in which the second rotating balls are positioned and which may have a larger size than the first cavities.

In accordance with an embodiment of the present invention, the first plate and the second plate may be used as electrodes for applying voltages to the first rotating balls and the second rotating balls.

In accordance with an embodiment of the present invention, the second barrier structure may have a structure in which regions facing the first rotating balls are recessed.

In accordance with an embodiment of the present invention, each of the first rotating balls may consist of a first hemisphere and a second hemisphere having a different charge value from the first hemisphere, and each of the second rotating balls may consist of a third hemisphere and a fourth hemisphere having a different charge value from the third hemisphere, wherein the first hemisphere may have a black color, the second hemisphere may have a white color, the third hemisphere may have one of red, green, blue, cyan, magenta, and yellow colors, and the fourth hemisphere may have another of black, white, red, green, blue, cyan, magenta, and yellow colors.

In accordance with an embodiment of the present invention, the second rotating balls may be disposed two-dimensionally to form a zigzag shape, and a center of the first rotating ball may be disposed to coincide with a center of a triangle which connects center points of the adjacent three second rotating balls.

In accordance with an embodiment of the present invention, the electronic paper display device may further include a spacer disposed between the lower structure and the upper structure to maintain an interval between the lower structure and the upper structure at a predetermined interval.

In accordance with still another aspect of the present invention to achieve the object, there is provided a method of manufacturing an electrode paper display device including the steps of: manufacturing a lower structure having first rotating balls; manufacturing an upper structure having second rotating balls with a larger size than the first rotating balls; coupling the lower structure and the upper structure so that the first rotating balls face a region between the second rotating balls; and filling an insulating oil in a space between the lower structure and the upper structure.

In accordance with an embodiment of the present invention, the step of manufacturing the lower structure may include the steps of preparing a first plate, forming a first insulating layer on the first plate, and forming first cavities in which the first rotating balls are positioned by removing portions of the first insulating layer, and the step of manufacturing the upper structure may include the steps of preparing a second plate, forming a second insulating layer on the second plate, and forming second cavities in which the second rotating balls are positioned and which have a larger, size than the first cavities.

In accordance with an embodiment of the present invention, the first plate and the second plate may be used as electrodes for applying voltages to the first and second rotating balls.

In accordance with an embodiment of the present invention, the step of coupling the lower structure and the upper structure may include the steps of forming a spacer on the lower structure and closely contacting the upper structure to the lower structure by using the spacer as a stopper.

In accordance with an embodiment of the present invention, the step of manufacturing the upper structure may include the step of forming a second barrier structure for separating the second rotating balls in a lateral direction, and the step of forming the spacer may include the step of forming an insulator with a larger thickness than the second barrier structure in a region other than a pixel region of the electronic paper display device.

In accordance with an embodiment of the present invention, the step of manufacturing the upper structure may include the steps of preparing a second plate, forming a second barrier structure on the second plate to separate the second rotating balls in a lateral direction, forming an adhesive in the second cavities, and attaching the second rotating balls in the second cavities by using the adhesive.

In accordance with an embodiment of the present invention, the adhesive may be an insulating oil.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

Figure 1:
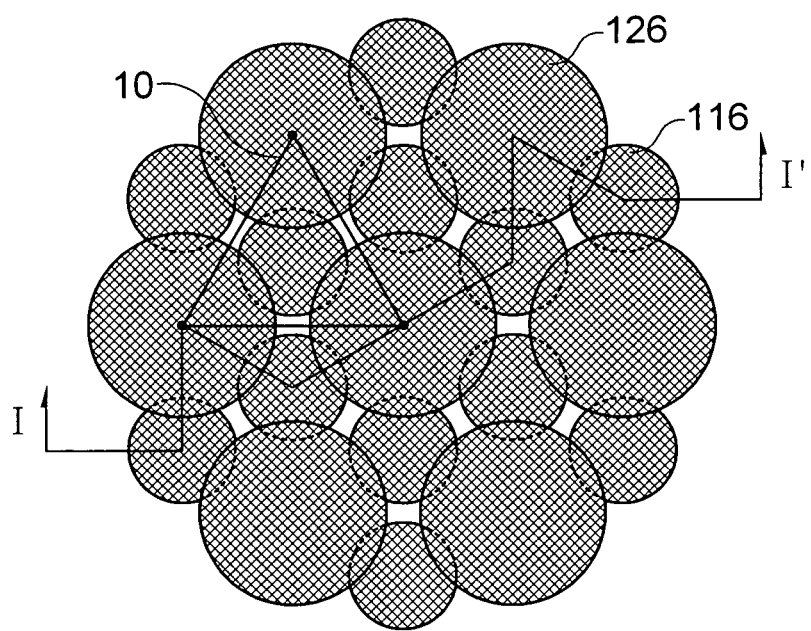
FIG. 1 is a plan view for explaining rough ball placement of an electronic paper display device in accordance with an embodiment of the present invention.

Advantages and features of the present invention and methods of accomplishing the same will be apparent with reference to the following embodiments described in detail in conjunction with the accompanying drawings. However, the present invention is not limited to the following embodiments but may be embodied in various other forms. The embodiments are provided to complete the disclosure of the present invention and to completely inform a person with average knowledge in the art of the scope of the present invention. Like reference numerals refer to like elements throughout the specification.

Terms used herein are provided to explain embodiments, not limiting the present invention. Throughout this specification, the singular form includes the plural form unless the context clearly indicates otherwise. The terms "comprise" and/or "comprising" do not exclude the existence or addition of one or more different components, steps, operations, and/or elements.

Hereinafter, an electronic paper display device and a method of manufacturing the same in accordance with embodiments of the present invention will be described in detail with reference to the accompanying drawings.

Figure 2:
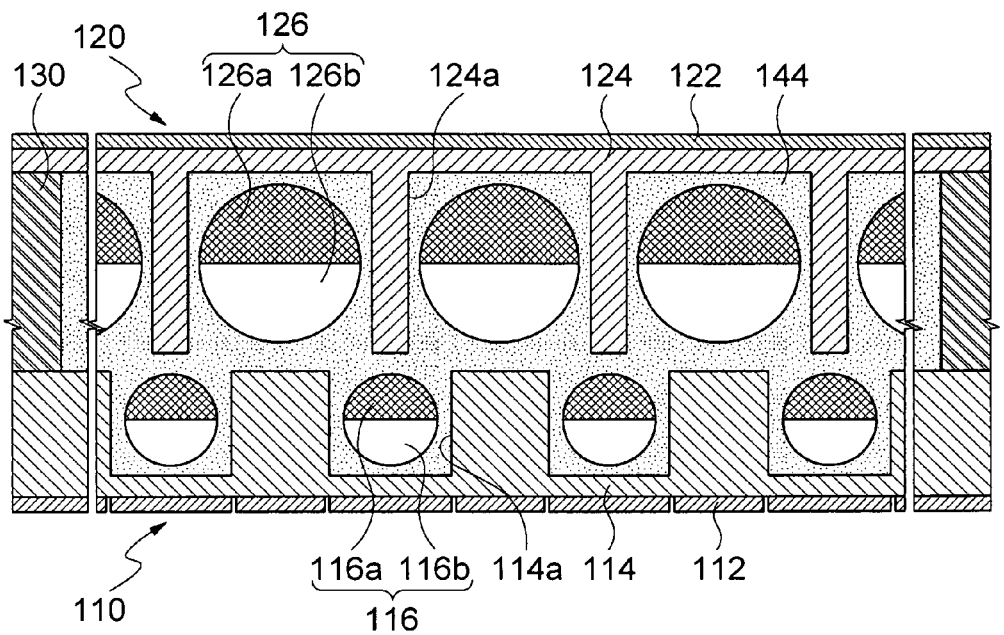
FIG. 2 is a cross-sectional view taken along line I-I' shown in FIG. 1.

FIG. 1 is a plan view for explaining rough ball placement of an electronic paper display device in accordance with an embodiment of the present invention, and FIG. 2 is a cross-sectional view taken along line I-I' shown in FIG. 1.

Referring to FIGS. 1 to 2, an electronic paper display device 100 in accordance with an embodiment of the present invention may include a lower structure 110, an upper structure 120, a spacer 130, and an insulating oil 144.

The lower structure 110 may include a first plate 112, a first barrier structure 114, and auxiliary color representation means (hereinafter, first rotating balls: 116). The first plate 112 may be a base substrate for supporting the first barrier structure 114 and the first rotating balls 116. The first plate 112 may be made of a metal material. In this case, the first plate 112 may be used as an electrode for rotating the first rotating balls 116.

The first barrier structure 114 supports and separates the first rotating balls 116 on the first plate 112. The first barrier structure 114 may be an insulation pattern which covers the first plate 112. The insulation pattern may have first cavities 114a in which the first rotating balls 116 are positioned. The first cavities 114a may have a column shape open toward an upper part of the lower structure 110.

Each of the first rotating balls 116 may have a spherical shape consisting of a first hemisphere 116a and a second hemisphere 116b. The first hemisphere 116a and the second hemisphere 116b may have different colors. As an example, the first hemisphere 116a may have one of black, white, red, green, blue, cyan, magenta, and yellow colors, and the second hemisphere 116b may have another of black, white, red, green, blue, cyan, magenta, and yellow colors. In addition, a charge value of the first hemisphere 116a and a charge value of the second hemisphere 116b may be different from each other. As an example, the first hemisphere 116a and the second hemisphere 116b may be electrified with different charges. As another example, only one of the first hemisphere 116a and the second hemisphere 116b may selectively electrified so that the charge values of first hemisphere 116a and the second hemisphere 116b may be different from each other.

The upper structure 120 may include a second plate 122, a second barrier structure 124, and main color representation means 126. The second plate 122 may be a base substrate for supporting the second barrier structure 124 and the main color representation means 126. The second plate 122 may be made of a metal material. In this case, the second plate 122 may be used as an electrode for rotating the main color representation means 126. Meanwhile, the second plate 122 may be made of a material having high light transmittance. More specifically, colors of the first rotating balls 116 and the main color representation means 126 may be displayed to the outside through the upper structure 120. Accordingly, it may be preferred that the second plate 122 is made of a transparent material having high light transmittance to prevent deterioration of color representation efficiency of the first rotating balls 116 and the main color representation means 126. For example, the second plate 122 may be a glass substrate. In this case, an electrode for applying voltages to the first rotating balls 116 and the main color representation means 126 with the first plate 112 may be separately provided on the second plate 122.

The second barrier structure 124 can support and separate the main color representation means 126 on the second plate 122. The second barrier structure 124 may be an insulation pattern which covers the second plate 122. The insulation pattern may have second cavities 124a in which the main color representation means 126 are positioned. The second cavities 124a may have a column shape open toward the upper part of the lower structure 110.

The main color representation means 126 may be a component for representing colors to the outside through the second plate 122. For example, the main color representation means 126 may be rotating balls with a larger size than the first rotating balls 116. As an example, each of the main color representation means (hereinafter, second rotating balls: 126) may have a spherical shape consisting of a third hemisphere 126a and a fourth hemisphere 126b. The third hemisphere 126a and the fourth hemisphere 126b may have different colors. In addition, a charge value of the third hemisphere 126a and a charge value of the fourth hemisphere 126b may be different from each other. A color selection method and a charge value adjustment method of the third hemisphere 126a and the fourth hemisphere 126b may be substantially equal to those of the first and second hemispheres 116a and 116b.

Meanwhile, the first rotating ball 116 may represent colors to the outside through a space between the second rotating balls 126. For example, the second rotating balls 126 may be disposed two-dimensionally to occupy most of a color representation area of the electronic paper display device 100, where colors are represented. For this, the second rotating balls 126 may be disposed in a zigzag shape. Accordingly, the second rotating balls 126 as main rotating balls for representing colors can represent colors to the outside. However, since the second rotating balls 126 have a spherical shape, even though the second rotating balls 126 are disposed close to each other, there occurs an empty space between the second rotating balls 126. This empty space becomes a dead region of color representation where colors are not represented by the second rotating balls 126. Therefore, the first rotating ball 116 may be disposed in the space between the second rotating balls 126 to represent colors to the outside through the dead region of color representation. As an example, a center of the first rotating ball 116 may be disposed to coincide with a center of a triangle 10 which connects center points of the adjacent three second rotating balls 126. In this case, the first rotating balls 116 may be disposed to face the second barrier structure 124.

Further, it may be preferred that a size of the first rotating ball 116 is adjusted to have a smaller diameter than the second rotating ball 126. More specifically, as the size of the first rotating ball 116 increases, it is possible to represent colors to more of the color dead region and thus it is possible to improve color clarity of the electronic paper display device 100. However, when the size of the first rotating ball 116 is equal to or larger than that of the second rotating ball 126, efficiency of improving color gamut by the first rotating ball 116 may be rather deteriorated. Further, judging from the other side, when the size of the first rotating ball 116 is equal to or larger than that of the second rotating ball 126, since there occurs a collision between the adjacent first rotating balls 116 or the first barrier structure 114 should be extremely thin, there may be a lot of limitations on placement of the first rotating balls 116, manufacture of the first barrier structure 114, and so on. Accordingly, it may be advantageous for the placement of the first rotating balls 116 and manufacturing efficiency of the first barrier structure 114 to reduce the size of the first rotating ball 116 than that of the second rotating ball 126. For example, the diameter of the first rotating ball 116 may be adjusted to about ¼ to ½ of a diameter of the second rotating ball 126. When the diameter of the first rotating ball 116 is smaller than ¼ of the diameter of the second rotating ball 126, functions of the first rotating ball 116 as the auxiliary color representation means may be deteriorated. When the diameter of the first rotating ball 116 is larger than ½ of the diameter of the second rotating ball 126, it may be difficult to secure a space for placing the first rotating ball 116.

The spacer 130 may maintain an interval between the lower structure 110 and the upper structure 120 at a predetermined interval. For this, a height of the spacer 130 may be equal to the predetermined interval between the lower structure 110 and the upper structure 120. Further, the spacer 130 may be disposed between the lower structure 110 and the upper structure 120 in plural number to prevent the interval between the lower structure 110 and the upper structure 120 from being widened or narrowed.

The insulating oil 144 may be a liquid for providing lubricity to the first and second rotating balls 116 and 126 for smooth rotation of the first and second rotating balls 116 and 126. For this, the insulating oil 144 may fill a space between the lower structure 110 and the upper structure 120. That is, the insulating oil 144 may fill the inside of the first and second cavities 114a and 124a. It may be preferred that the insulating oil 144 is made of a material having high light transmittance to prevent deterioration of color gamut of the first and second rotating balls 116 and 126.

The above electronic paper display device 100 may be operated as follows. As an example, the first hemisphere 116a of the first rotating ball 116 may have a black color, and the second hemisphere 116b may have a white color. And the third hemisphere 126a of the second rotating ball 126 may have one of red, green, blue, cyan, magenta, and yellow colors, and the fourth hemisphere 126b may have one of black and white colors. In this case, the first and second plates 112 and 122 apply voltages to the second rotating balls 126 so that the third hemisphere 126a faces the second plate 122 to represent colors to the outside. At this time, the first and second plates 112 and 122 apply voltages to the first rotating balls 116 so that the first hemisphere 116a or the second hemisphere 116b selectively faces the second plate 122 to adjust brightness and chroma of a combination color represented by the second rotating balls 126. Accordingly, since the electronic paper display device 100 can adjust the brightness and chroma of the color represented by the second rotating balls 126 by selectively rotating the first rotating balls 116, it is possible to improve a contrast ratio and reflectivity.

As described above, the electronic paper display device 100 in accordance with an embodiment of the present invention may be configured so that the first rotating balls 116, which are disposed relatively far from a color display surface, represent colors to the outside through the color dead regions of the second rotating balls 126 disposed adjacent to the color display surface. Accordingly, the electronic paper display device 100 in accordance with the present invention can have a structure capable of improving color gamut, a contrast ratio, and reflectivity by allowing rotating balls disposed on another plane to represent colors through dead regions of color representation of rotating balls disposed on one plane.

Continuously, a method of manufacturing an electronic paper display device in accordance with an embodiment of the present invention will be described in detail. Here, repeated description of the above-described electronic paper display device in accordance with an embodiment of the present invention will be omitted or simplified.

Figure 3:
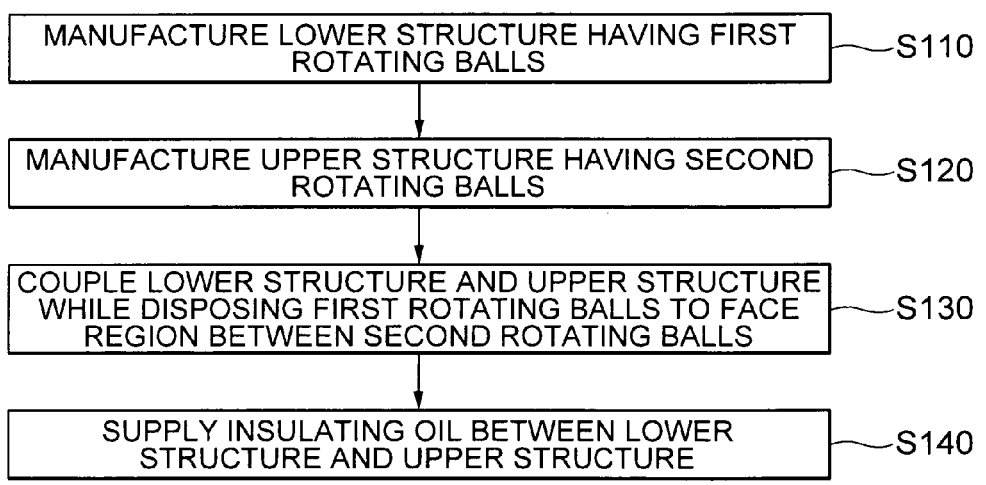
FIG. 3 is a flow chart showing a method of manufacturing an electronic paper display device in accordance with an embodiment of the present invention.

FIG. 3 is a flow chart showing a method of manufacturing an electronic paper display device in accordance with an embodiment of the present invention, and FIGS. 4a to 4d are views for explaining a process of manufacturing an electronic paper display device in accordance with an embodiment of the present invention.

Figure 4A:
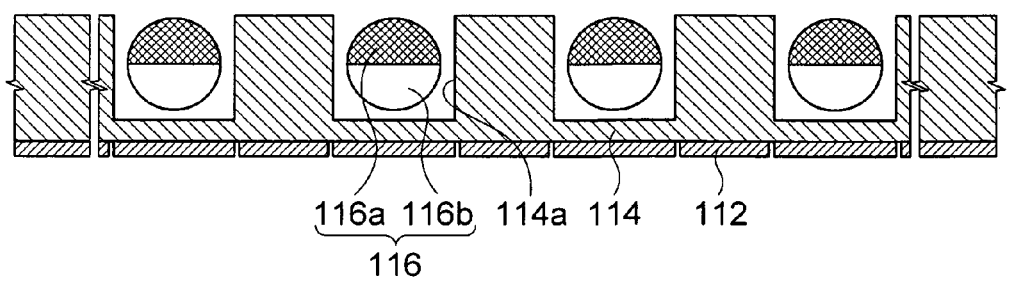
FIGS. 4a to 4d are views for explaining a process of manufacturing an electronic paper display device in accordance with an embodiment of the present invention.

Referring to FIGS. 3 and 4a, a lower structure 110 having first rotating balls 116 is manufactured (S110). The step of manufacturing the lower structure 110 may include the steps of preparing a first plate 112, forming a first barrier structure 114 having first cavities 114a on the first plate 110, and positioning the first rotating balls 116 in the first cavities 114a.

The step of preparing the first plate 112 may include the step of preparing a plate having conductivity. As an example, the first plate 112 may be a metal plate. The first plate 112 may be used as an electrode for rotating the first rotating balls 116.

The step of forming the first barrier structure 114 may include the steps of forming a first insulating layer on the first plate 112 and forming first recessed portions in the first insulating layer. The first insulating layer may be a photoreactive insulating film such as dry film resist (DFR). When the first insulating layer is DFR, the step of forming the first insulating layer may be performed by laminating the DFR on the entire surface of the first plate 112. The step of forming the first recessed portions may be performed by a photolithography process of selectively removing some regions of the DFR. In the present embodiment, although it is explained as an example that the first barrier structure 114 is formed by a photolithography process, the first barrier structure 114 may be formed by various methods. For example, the first barrier structure 114 may be formed by an imprinting process or a predetermined etching process.

Figure 4B:
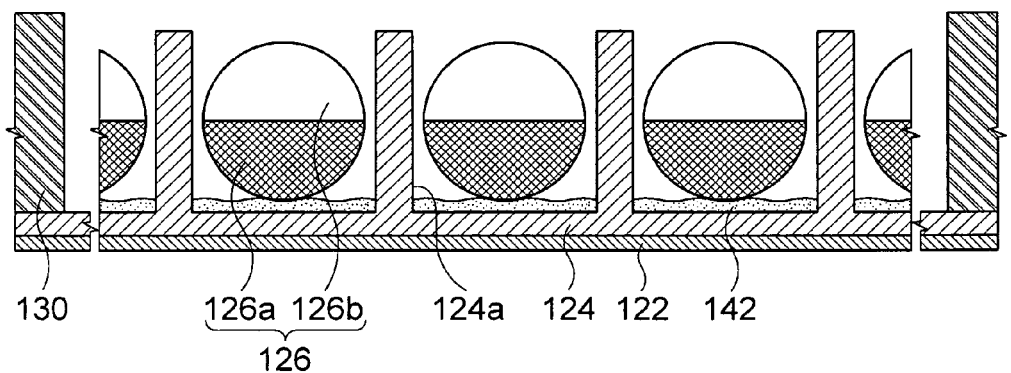

Referring to FIGS. 3 and 4b, an upper structure 120 having second rotating balls 126 is manufactured (S120). The step of manufacturing the upper structure 120 may include the steps of preparing a second plate 122, forming a second barrier structure 124 having second cavities 124a on the second plate 122, and positioning the second rotating balls 126 in the second cavities 124a.

The step of preparing the second plate 122 may include the step of preparing a plate having conductivity and light transmittance. As an example, the second plate 122 may be a transparent electrode such as ITO.

The step of forming the second barrier structure 124 may include the steps of forming a second insulating layer for forming a barrier on the second plate 122 and forming second recessed portions for positioning the second rotating balls 126 on the second insulating layer. The second insulating layer may be a photoreactive insulating film such as DFR. When the second insulating layer is DFR, the step of forming the second insulating layer may be performed by laminating the DFR on the entire surface of the second plate 122. The step of forming the second recessed portions may be performed by a photolithography process of selectively removing some regions of the DFR. In the present embodiment, although it is explained as an example that the second barrier structure 124 is formed by a photolithography process, the second barrier structure 124 may be formed by various methods. For example, the second barrier structure 124 may be formed by an imprinting process or a predetermined etching process.

Figure 4C:
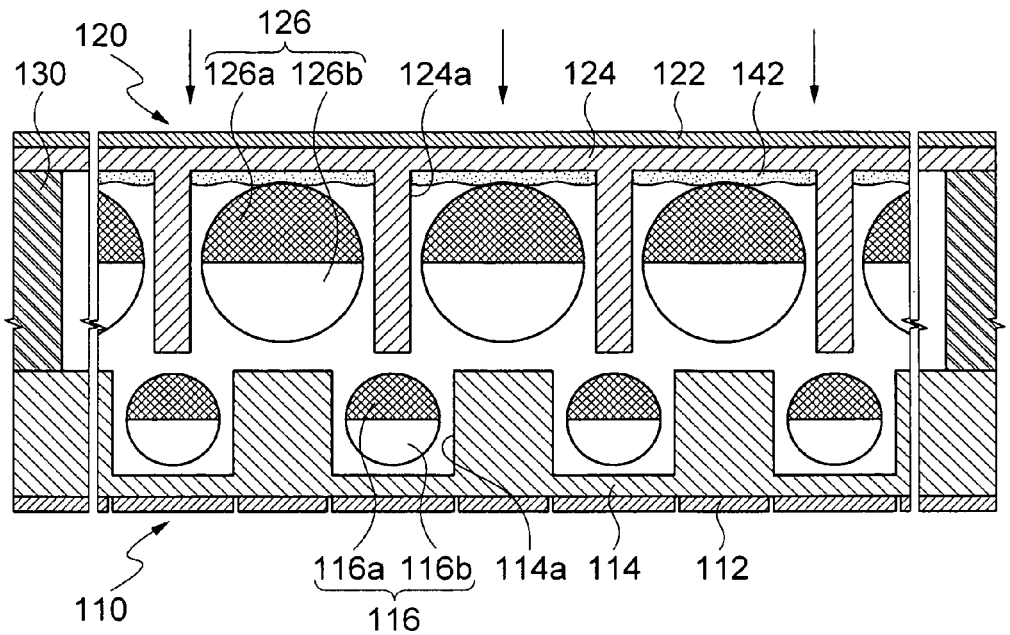

Referring to FIGS. 3 and 4c, the lower structure 110 and the upper structure 120 are coupled with the first rotating balls 116 facing a region between the second rotating balls 126 (S130). For example, a spacer 130 may be formed on at least one of the lower structure 110 and the upper structure 120. The step of forming the spacer 130 may be performed by forming an insulator in a region other than a pixel region of the electronic paper display device.

The upper structure 120 may be positioned on the lower structure 110. For example, the upper structure 120 may be disposed on the lower structure 110 so that the first barrier structure 114 and the second barrier structure 124 face each other. At this time, the upper structure 120 may be aligned on the lower structure 110 so that each of the first rotating balls 116 is positioned in the region between the second rotating balls 126. For this, the step of turning over the upper structure 120 may be added.

Meanwhile, in a process of turning over the upper structure 120, the second rotating balls 126 may be separated from the second cavities 124a. In order to prevent this, in a process of positioning the second rotating balls 126 in the second cavities 124a, the step of forming an adhesive 142 in the second cavities 124a may be added. The adhesive 142 may prevent the separation of the second rotating balls 126 when the upper structure 120 is turned over. The adhesive 142 may be an insulating oil for rotational lubricity of the first and second rotating balls 116 and 126.

And, by using the spacer 130 as a stopper, the upper structure 120 is closely adhered toward the lower structure 110. Accordingly, the lower structure 110 and the upper structure 120 are closely coupled to each other by the spacer 130 while maintaining a predetermined interval.

Figure 4D:
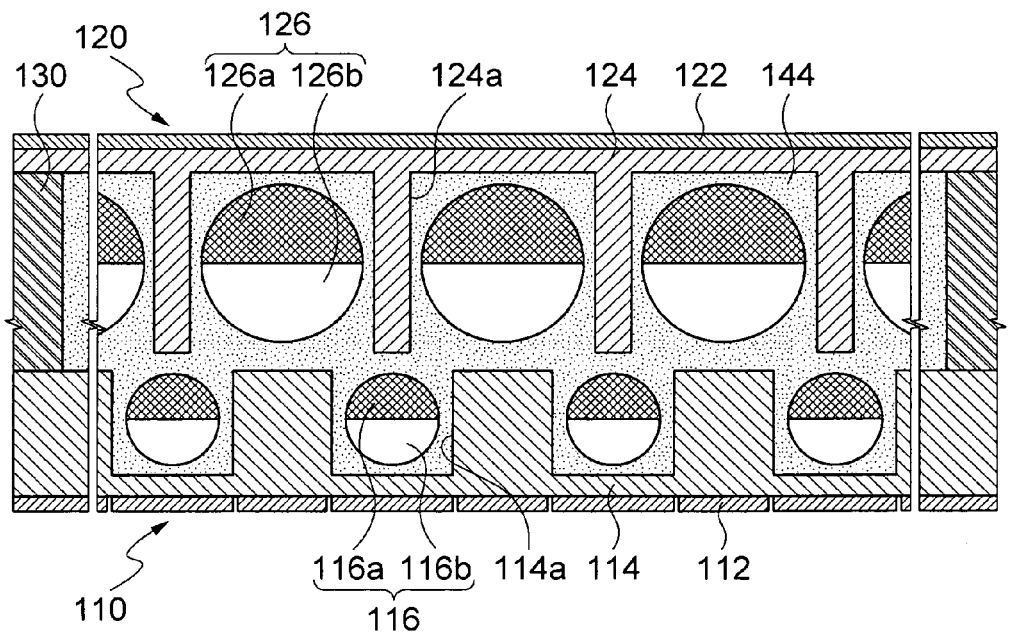

Referring to FIGS. 3 and 4d, an insulating oil 144 is supplied between the lower structure 110 and the upper structure 120 (S140). For example, the insulating oil 144 may be supplied to fill the first and second cavities 114a and 124a through an injection path after forming a predetermined injection path (not shown) between the lower and upper structures 110 and 120.

As described above, the method of manufacturing an electronic paper display device in accordance with an embodiment of the present invention can manufacture an electronic paper display device having a structure in which the first rotating balls 116 are disposed to represent colors through a region between the second rotating balls 126 by manufacturing the lower structure 110 having the first rotating balls 116, manufacturing the upper structure 120 having the second rotating balls 126, and coupling the lower structure 110 and the upper structure 120 with the first rotating balls 116 facing a region between the second rotating balls 126. Accordingly, the method of manufacturing an electronic paper display device in accordance with the present invention can manufacture an electronic paper display device having a structure capable of improving color gamut, a contrast ratio, and reflectivity by allowing rotating balls disposed on a different plane to represent colors through dead regions of color representation of rotating balls disposed on one plane.

Hereinafter, a modified example of the electronic paper display device in accordance with an embodiment of the present invention will be described in detail. Here, repeated description of the electronic paper display device 100 described above with reference to FIGS. 1 to 4d will be omitted or simplified.

Figure 5:
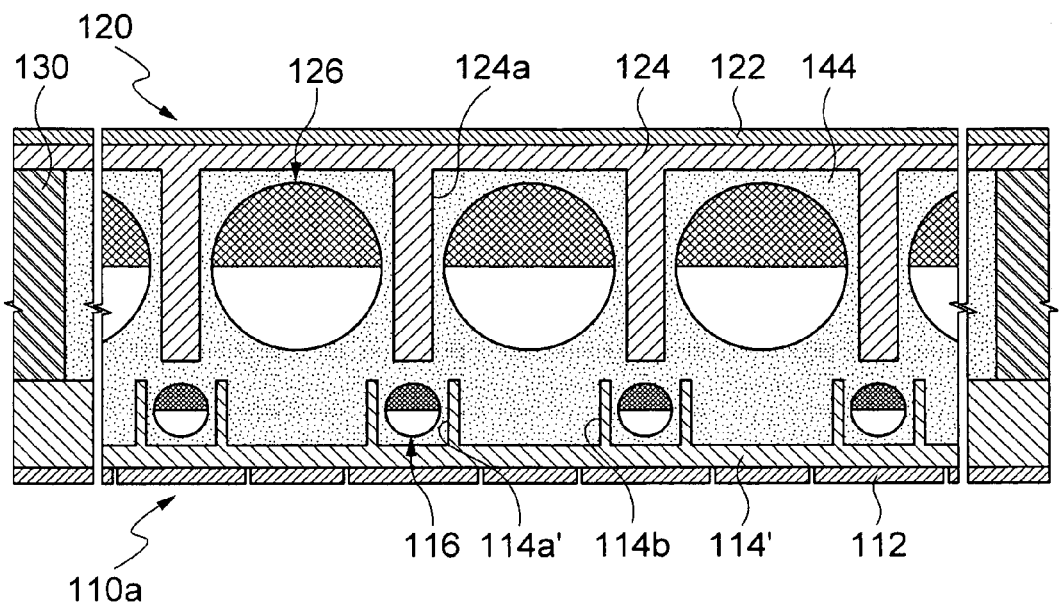
FIG. 5 is a view showing a modified example of the electronic paper display device in accordance with an embodiment of the present invention.

FIG. 5 is a view showing an electronic paper display device in accordance with a modified example of the present invention. Referring to FIG. 5, an electronic paper display device 101 in accordance with a modified example of the present invention may include a lower structure 110a having first rotating balls 116, an upper electrode 120 having second rotating balls 126, a spacer 130, and an insulating oil 140. The lower structure 110a may include a first barrier structure 114' having recessed portions facing the second rotating balls 126.

For example, the first barrier structure 114' may be formed on a first plate 112. The first barrier structure 114' may have first cavities 114a' to separate the first rotating balls 116 in a lateral direction. Further, the first barrier structure 114a' may have the recessed portions (hereinafter, third cavities: 114b) in regions facing the second rotating balls 126. The third cavities 114b may be provided to face the second rotating balls 126 and have a structure open toward the second rotating balls 126.

Here, the third cavities 114b may be provided to improve rotation characteristics of the second rotating balls 126. More specifically, vertical movement of the second rotating balls 126 may be performed with rotation movement of the second rotating balls 126 during rotation of the second rotating balls 126. Accordingly, for the efficient rotation of the second rotating balls 126, it may be preferable to secure a sufficient vertical height for the vertical movement of the second rotating balls 126. For this, the third cavities 114b may be provided to secure a space for the vertical movement of the second rotating balls 126.

Meanwhile, in order to sufficiently secure the third cavities 114b, it may be preferable to have a structure in which the regions facing the second rotating balls 126 are substantially open. For this, it may be preferred that a size of the first rotating balls 116 is relatively small to secure a space for the third cavities 114b. As an example, a diameter of the first rotating ball 116 may be adjusted to be smaller than ⅓ of a diameter of the second rotating ball 126. When the diameter of the first rotating ball 116 is larger than ⅓ of the diameter of the second rotating ball 126, since a size of the third cavities 114b is relatively increased, efficiency of the vertical movement of the second rotating balls 126 may be deteriorated.

As described above, the electronic paper display device 101 in accordance with a modified example of the present invention may be configured so that the first rotating balls 116 represent colors to the outside through the color dead regions of the second rotating balls 126. The first barrier structure 114' for separating the first rotating balls 116 in a lateral direction may have the third cavities 114b which are formed in the regions facing the second rotating balls 126 to be open toward the second rotating balls 126. Accordingly, an electronic paper display device in accordance with the present invention can have a structure capable of improving rotation characteristics of rotating balls by forming cavities in a barrier structure for separating auxiliary color representation means to secure a space for vertical movement occurred during rotation movement of the rotating balls as main color representation means.

An electronic paper display device in accordance with the present invention can have a structure with improved color gamut, contrast ratio, and reflectivity by allowing rotating balls disposed on a different plane to represent colors through dead regions of color representation of rotating balls disposed on one plane.

A method of manufacturing an electronic paper display device in accordance with the present invention can manufacture an electronic paper display device having a structure with improved color gamut, contrast ratio, and reflectivity by allowing rotating balls disposed on a different plane to represent colors through dead regions of color representation of rotating balls disposed on one plane.

The foregoing description illustrates the present invention. Additionally, the foregoing description shows and explains only the preferred embodiments of the present invention, but it is to be understood that the present invention is capable of use in various other combinations, modifications, and environments and is capable of changes and modifications within the scope of the inventive concept as expressed herein, commensurate with the above teachings and/or the skill or knowledge of the related art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. An electronic paper display device comprising:
  rotating balls disposed on the same plane to represent colors to the outside; and
  an auxiliary color representation means for representing colors to the outside through a space between the rotating balls.

2. The electronic paper display device according to claim 1, wherein the auxiliary color representation means comprises rotating balls with a smaller size than the rotating balls.

3. The electronic paper display device according to claim 1, wherein the auxiliary color representation means is disposed to face a region between the rotating balls.

4. The electronic paper display device according to claim 1, comprising:
  a barrier structure for separating the rotating balls in a lateral direction, wherein the barrier structure is made of a transparent material having light transmittance, and the auxiliary color representation means represents colors to the outside through the barrier structure.

5. An electronic paper display device comprising:
  a lower structure having first rotating balls;
  an upper structure disposed on the lower structure and having second rotating balls with a larger size than the first rotating balls; and
  an insulating oil for filling a space between the lower structure and the upper structure, wherein the first rotating balls are disposed to face a region between the second rotating balls.

6. The electronic paper display device according to claim 5, wherein the second rotating balls are disposed two-dimensionally to form a zigzag shape, and a center of the first rotating ball is disposed to coincide with a center of a triangle which connects center points of the adjacent three second rotating balls.

7. The electronic paper display device according to claim 5, further comprising:
  a spacer disposed between the lower structure and the upper structure to maintain an interval between the lower structure and the upper structure at a predetermined interval.

8. The electronic paper display device according to claim 5, wherein the lower structure comprises:
  a first plate; and
  a first barrier structure formed on the first plate and having first cavities in which the first rotating balls are positioned, and the upper structure comprises:

a second plate; and a second barrier structure formed on the second plate and having second cavities in which the second rotating balls are positioned and which have a larger size than the first cavities.

9. The electronic paper display device according to claim 8, wherein the first plate and the second plate are used as electrodes for applying voltages to the first rotating balls and the second rotating balls.

10. The electronic paper display device according to claim 8, wherein the second barrier structure has a structure in which regions facing the first rotating balls are recessed.

11. The electronic paper display device according to claim 8, wherein each of the first rotating balls consists of a first hemisphere and a second hemisphere having a different charge value from the first hemisphere, and each of the second rotating balls consists of a third hemisphere and a fourth hemisphere having a different charge value from the third hemisphere, wherein the first hemisphere has a black color, the second hemisphere has a white color, the third hemisphere has one of red, green, blue, cyan, magenta, and yellow colors, and the fourth hemisphere has another of black, white, red, green, blue, cyan, magenta, and yellow colors.

12. A method of manufacturing an electronic paper display device comprising:

manufacturing a lower structure having first rotating balls;

manufacturing an upper structure having second rotating balls with a larger size than the first rotating balls;

coupling the lower structure and the upper structure so that the first rotating balls face a region between the second rotating balls; and filling an insulating oil in a space between the lower structure and the upper structure.

13. The method of manufacturing an electronic paper display device according to claim 12, wherein manufacturing the lower structure comprises:

preparing a first plate;

forming a first insulating layer on the first plate; and forming first cavities in which the first rotating balls are positioned by removing portions of the first insulating layer, and manufacturing the upper structure comprises:

preparing a second plate;

forming a second insulating layer on the second plate; and forming second cavities in which the second rotating balls are positioned and which have a larger size than the first cavities.

14. The method of manufacturing an electronic paper display device according to claim 13, wherein the first plate and the second plate are used as electrodes for applying voltages to the first and second rotating balls.

15. The method of manufacturing an electronic paper display device according to claim 12, wherein coupling the lower structure and the upper structure comprises:

forming a spacer on the lower structure; and closely contacting the upper structure to the lower structure by using the spacer as a stopper.

16. The method of manufacturing an electronic paper display device according to claim 15, wherein manufacturing the upper structure comprises:

forming a second barrier structure for separating the second rotating balls in a lateral direction, and forming the spacer comprises:

forming an insulator with a larger thickness than the second barrier structure in a region other than a pixel region of the electronic paper display device.

* * * * *

UNITED STATES PATENT AND TRADEMARK OFFICE
CERTIFICATE OF CORRECTION

| | | |
|---|---|---|
| PATENT NO. | : 8,611,001 B2 | Page 1 of 1 |
| APPLICATION NO. | : 13/373295 | |
| DATED | : December 17, 2013 | |
| INVENTOR(S) | : Hwan Soo Lee et al. | |

It is certified that error appears in the above-identified patent and that said Letters Patent is hereby corrected as shown below:

On the Title Page Item (75), In Column 1 (Inventors), Line 2, Delete "Gyoenggi-do (KR)" and insert -- Gyeonggi-do (KR) --, therefor.

Signed and Sealed this
Twenty-fifth Day of March, 2014

Michelle K. Lee
*Deputy Director of the United States Patent and Trademark Office*